(12) United States Patent
Isola

(10) Patent No.: US 6,312,590 B1
(45) Date of Patent: Nov. 6, 2001

(54) MECHANICALLY CLEANABLE SCREEN

(76) Inventor: Antti Isola, Loveret 1 D 26, FIN-68600 Pietarsaari (FI)

( * ) Notice: Subject to any disclaimer, the term of this patent is extended or adjusted under 35 U.S.C. 154(b) by 0 days.

(21) Appl. No.: 09/509,500

(22) PCT Filed: Sep. 29, 1998

(86) PCT No.: PCT/FI98/00766

§ 371 Date: Mar. 29, 2000

§ 102(e) Date: Mar. 29, 2000

(87) PCT Pub. No.: WO99/16963

PCT Pub. Date: Apr. 8, 1999

(30) Foreign Application Priority Data

Sep. 29, 1997 (FI) ......................................................... 973822

(51) Int. Cl.⁷ ................................................. B01D 29/62
(52) U.S. Cl. .......................... 210/155; 210/158; 210/357; 210/391; 210/499
(58) Field of Search .................................... 210/158, 162, 210/173, 357, 391, 392, 413, 498, 499, 335, 155, 396; 162/251

(56) References Cited

U.S. PATENT DOCUMENTS

| | | | |
|---|---|---|---|
| 452,595 | * 5/1891 | Correll . | |
| 864,507 | * 8/1907 | Brunotte . | |
| 1,874,126 | * 8/1932 | Schofield et al. | 210/357 |
| 2,419,155 | * 4/1947 | Orton . | |
| 3,752,319 | 8/1973 | Richter | 210/357 |
| 3,755,072 | * 8/1973 | Ostberg et al. | 162/251 |
| 5,277,799 | * 1/1994 | Bransch | 210/162 |

FOREIGN PATENT DOCUMENTS

| | | |
|---|---|---|
| 44322 | 6/1971 | (FI) . |
| 54509 | 8/1978 | (FI) . |
| 1200208 | 7/1970 | (GB) . |
| WO 8404293 | 11/1984 | (WO) . |
| WO 9619614 | 6/1996 | (WO) . |

* cited by examiner

*Primary Examiner*—Joseph W. Drodge
(74) *Attorney, Agent, or Firm*—Young & Thompson

(57) ABSTRACT

A mechanically cleanable screen for separating liquid from chips and pulp without the screen getting blocked, particularly in the process area where cooking and circulation liquids are removed from a pressure vessel during the production of chemical pulp and paper pulp by a continuous method. The screen has two screens: a primary screen and a secondary screen which are attached to a common body one after another in the direction of the liquid to be filtered so that they form a cassette. The blades of the secondary screen generate shear and push forces that clean the slots of the primary screen.

21 Claims, 2 Drawing Sheets

MECHANICALLY CLEANABLE SCREEN

BACKGROUND OF THE INVENTION

The invention relates to a mechanically cleanable screen.

Such a screen is used particularly when cooking and circulation liquids are being removed from a pressure vessel during the production of chemical pulp or paper pulp by a continuous method. The screen is primarily intended to be used for separating liquid from chips and/or pulp without the screen getting blocked and without disturbing the plug flow and other flows.

Chemically produced pulp should have both good strength properties and low kappa number, in other words low lignin content after cooking. These requirements are contradictory if the cooking conditions are not optimal. The cooking conditions include e.g. a correct alkaline distribution, suitable temperature profile, sufficient amount of liquid and as small gradients as possible particularly in the radial direction of the continuous digester. These conditions require high circulation and extraction flows. Since even partial blocking of extraction and circulation screens causes channelling and disturbs flows in the digester, and thus often results in losses in production, it is not always possible to maintain the conditions needed for producing clean pulp with good strength properties. Naturally this is highly disadvantageous since it for example increases the use of raw materials, energy and chemicals, which in turn increases the production costs and burdens the environment.

Several different solutions have been suggested for this blocking problem of the extraction and circulation screens of the continuous digester. In WO/11565 Kamyr Ab have suggested the use of several small screen elements provided with bars, which can be back-flushed with a high flow, also known as back spooling. The problem associated with this arrangement is the large amount of liquid required by back spooling, which decreases the efficiency of the flows through the screens. If the screen is seriously blocked e.g. by chips, shives and precipitates, the fluid pressure of back spooling does not necessarily provide sufficiently efficient cleaning.

Extraction and circulation screens have been conventionally arranged parallel with the pressure cover and thus also parallel with the plug flows. When the flow of cooking chemicals through the screens sucks chips, shives and precooked pulp against the screens, this and the radial component of the pressure caused by the chips pillar generate a resultant force which wedges the above-mentioned particles into the slots of the screens. These particles pile up one on the top of the other from below upwards causing blockages, which disturb the plug flow and cause channelling of the flows. Kamyr Ab have tried to solve this problem in Finnish Pat. No. 54509 where a screen comprises evenly arranged vertical screen rods which define screen slots between them. Blocking is prevented by moving the bottom end of every other screen rod, the top end of which is provided with a hinge, 5 to 15 mm from its middle position to both directions, assuming that this motion will remove a wedged blockage formed by chips or pulp from a screen slot. Since the static friction between the static screen rod and the blockage is greater than the dynamic friction between the dynamic screen rod and the blockage, the motion of the hinged screen rod against the flow does not generate a component of force which would push the blockage against the flow back into the plug flow. When the moving screen rod moves back in the flow direction, the dynamic friction increases the component of force that pushes the blockage into the screen slot, the force component being produced by the radial component of the dynamic pressure of the flow and the radial component of the static pressure of the plug flow. The motion of every other screen rod cannot generate any mechanical shear force or push force which would act directly on the screen slot and clean it. Furthermore, the screen rod moving like a pendulum moves chips or pulp back and forth, simultaneously working and crushing them. This is disadvantageous since the flow carries the diminished particles through the screen into the liquid circulation. In other words, the separating capacity of the screen decreases. Thus the solution disclosed in Fl 54509 impairs the function of the screen and screen slots that are blocked e.g. by chips or pulp cannot be cleaned with it.

SUMMARY OF THE INVENTION

The object of the present invention is to eliminate the drawbacks related to the prior art and to provide a totally novel solution. The screen arrangement of the invention separates chips and other particles of the type desired efficiently from liquid without getting blocked, thus improving continuous cooking and controlling thereof.

The object of the invention is achieved with a mechanically cleanable screen.

The invention is based on the idea that mechanical shear and push forces maintain the screen clean. The screen of the invention comprises two separate screens, i.e. a primary screen and a secondary screen. These are arranged into a common frame one after another in the flow direction of the liquid to be filtered so that they form a cassette. The cassette may be arranged inside the cover of a pressure vessel.

The invention has several considerable advantages. The screen arrangement of the invention enables continuous high extraction and circulation flows, which improves continuous cooking and controlling thereof significantly. Thus the chemical pulp or paper pulp to be obtained will have more uniform quality and better strength properties. The production process will also be more economical and friendlier to the environment.

BRIEF DESCRIPTION OF THE DRAWINGS

In the following the invention will be described in greater detail by means of a preferred embodiment of the invention with reference to the accompanying drawings, in which.

DETAILED DESCRIPTION OF THE PREFERRED EMBODIMENTS

A mechanically cleanable screen of the invention illustrated in FIGS. 1 to 4 comprises a primary screen 1 and a secondary screen 2 connected thereto. The parts of the screen are arranged into a frame 3 with which they form a cassette which can be arranged inside a pressure vessel to a pressure cover 4. In the screen arrangement used as an example the primary screen of the cassette is fixed and the secondary screen is mobile with respect to the frame.

Figure 1:
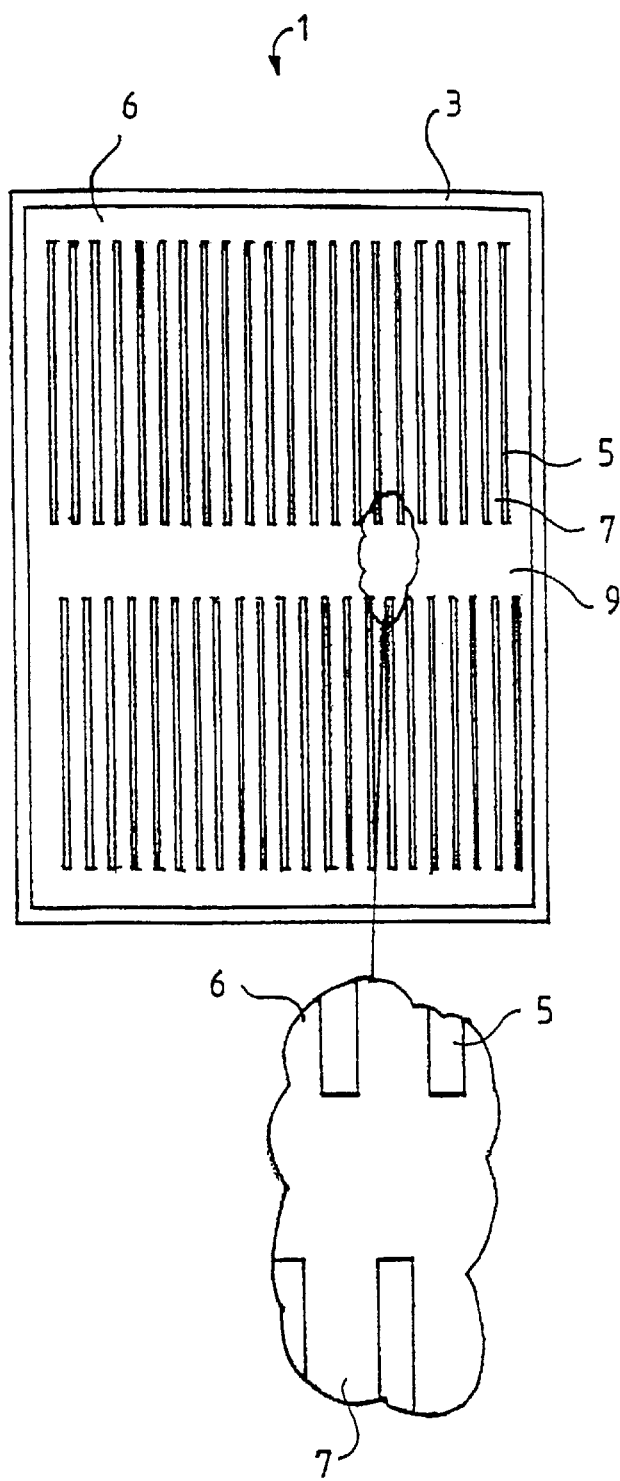
FIG. 1 is a front view of a primary screen of the invention.
Figure 2:
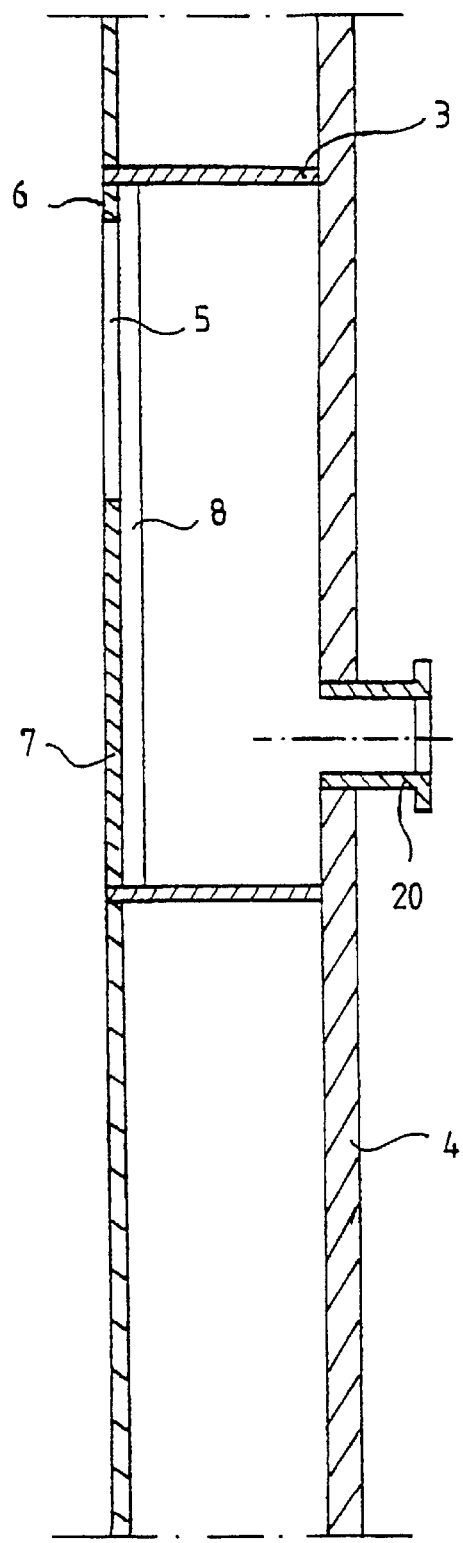
FIG. 2 illustrates the primary screen of FIG. 1 arranged to a pressure vessel.

The primary screen 1 according to FIGS. 1 and 2 comprises a filtering surface provided with substantially parallel, elongated precision slots 5, the precision slots being formed for example by making parallel slots to a planar or curved medium, such as a screen plate 6 of metal, according to FIG. 1. The thickness of the screen plate may vary from 1.0 mm to 50.0 mm depending on the situation. The width of the slots of the primary screen may vary from 1.0 mm to 20.0 mm depending on the purpose for which it is to be used, the width being preferably 3.0 to 8.0 mm. A strip 7 parallel with the precision slots is left between them, the width of the strip varying from 1.0 mm to 50.0 mm depending on the purpose for which the screen is to be used. Preferably the width of the strip is twice the width of the slot. If necessary, reinforcements 8 can be arranged behind the strip, the reinforcements being attached together with the primary screen to the frame 3 surrounding the screen.

The precision slots 5 of the primary screen 1 are not uniform along the entire length of the screen plate 6, but there are one or more uncut sections in the plate, i.e. a strip 9 transverse to the slots. After this transverse strip the precision slots are arranged in such a manner that they are misaligned with respect to the slots on the opposite side of the transverse strip, as is illustrated in the partial enlargement of FIG. 1. The extent of this misalignment depends on the number of the transverse strips and on the width of the longitudinal strips. If there is only one transverse strip, the centreline of the slot moves to the middle of the longitudinal strip preceding it on the other side of the transverse strip. If there are several transverse strips, the precision slots are misaligned so that after the transverse strip the misalignment of the centreline of the slot is at least half of the width of the slot.

Figure 3:
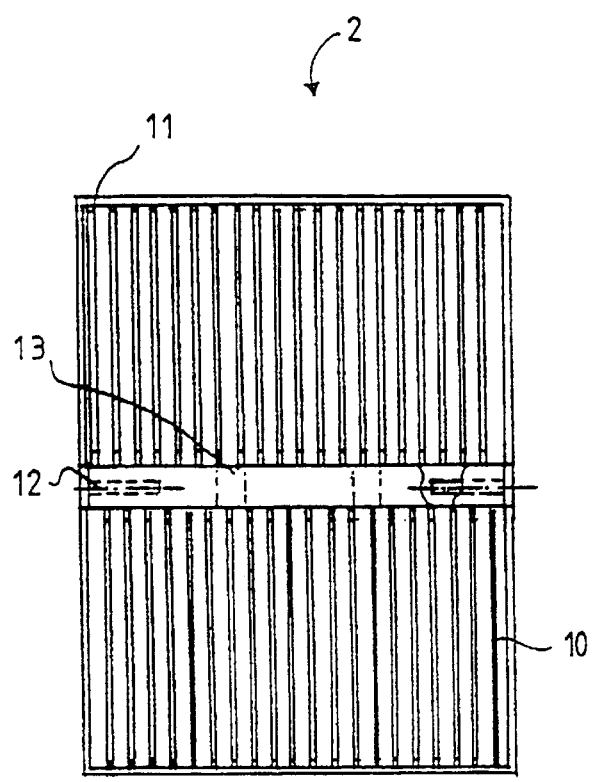
FIG. 3 is a front view of a secondary screen of the invention.
Figure 4:
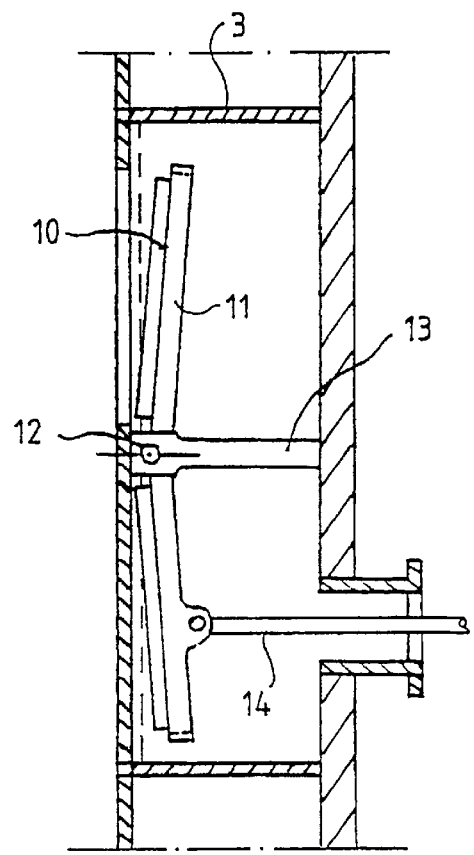
FIG. 4 illustrates the secondary screen of FIG. 3 arranged to a pressure vessel and an outline of the primary screen.

A secondary screen 2 according to FIGS. 3 and 4 comprises cleaning blades 10 which are arranged to a body 11, and bearings 12 which enable the motions of the secondary screen and are mounted on the frame 3. The secondary screen is arranged between the primary screen 1 described above and the pressure cover 4 of a pressure vessel preferably by means of support rails 13, as is described in FIG. 4. The secondary screen is arranged to move with respect to the primary screen in such a manner that the cleaning blade 10 of the secondary screen can be arranged to interlock with a precision slot 5 of the primary screen. Mechanical shear and push forces are generated by the motion between the primary screen and the secondary screen. The shear forces are both parallel with the strips 7 between the slots and the cleaning blades and vertical to the strips and the cleaning blades. The accurate direction of the resultant component of the push forces, which is directed to the middle of the plug flow, depends on the flow speed of the plug flow, the radial component of the pressure, the position of the screen and the push force.

Figure 5:
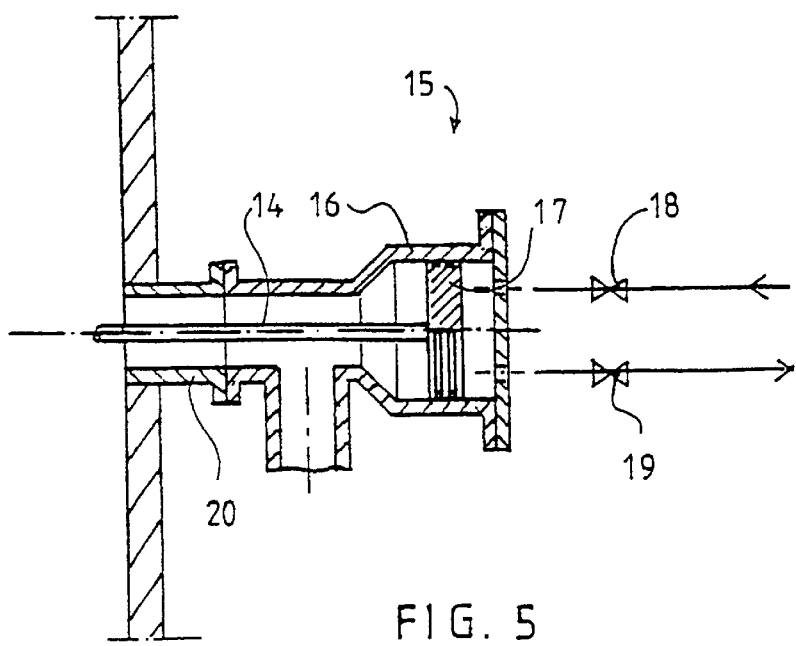
FIG. 5 is a schematic cross-sectional view of a power unit that moves the secondary screen.

The secondary screen 2 is arranged to move by means of a power unit 15 arranged to it with at least one push rod 14, cf. FIG. 5. The push rod is attached to the secondary screen so as to allow push and pull motions when the radial loads directed to the rod are eliminated. According to the figure, the force needed for moving the primary and secondary screens may be process pressure or other external force or a combination thereof. In the present example the pressure caused by the main circulation pump for wash liquor is used as the source of hydraulic force. Thus the power unit 15 may comprise for example a hydraulic cylinder 16 and a piston 17 which converts the process pressure into push force. The figure also illustrates a valve 18 on the high pressure side and a valve 19 on the low pressure side.

The cross section of the strips 7 between the precision slots 5 of the primary screen and the cross section of the cleaning blades 10 of the secondary screen may be either symmetric or asymmetric. On the other hand, the longitudinal profiles of the strips and cleaning blades may be straight, convex or concave with respect to the frame 3 around the screens. Even though in the embodiment of the invention used as an example the cleaning blades of the secondary screen are arranged to move with respect to the slots of the primary screen, the screens may be arranged to move either simultaneously or non-simultaneously, i.e. both screens move or only one screen moves and the other one is immobile.

The secondary screen 2 does not comprise actual filtering slots, but its filtering efficiency is based on the fact that the cleaning blades 10 reduce the size of the precision slot 5 of the primary screen 1 during the cleaning phase when the blade of the secondary screen penetrates into the slot of the primary screen. The change of the slot width between the primary screen and the secondary screen provides more efficient filtering, whereby the fixed slot space of the primary screen is reduced to a gap between the strip of the primary screen and the blade of the secondary screen, the gap being 0.01 mm to 6.0 mm, preferably 0.25 mm to 0.5 mm.

The motion between the primary screen and the secondary screen is arranged to be symmetrical with respect to the total area of the primary screen. Here a motion is interpreted as symmetric when the primary and secondary screens are arranged to move towards each other as parallel planes, the secondary screen being preferably planar in shape. However, if the bearings enabling the motion between the screens are arranged asymmetrically at a transverse strip of the primary screen, the linear motion between the screens can be compensated by shaping the cleaning blades of the secondary screen in such a manner that the cleaning blade has an optimal length of stroke. The transverse strips of the primary screen and the misalignments thereof can be arranged either to the middle of the screen (50/50 of the area) or non-centrally (e.g. 30/70 of the area). The transverse strips should not, however, be positioned right to the upper edge.

The exemplified screen of the invention functions in process conditions as follows: When circulation liquid is sucked out through a suction unit 20 and from the plug flow in the impregnation tower and continuous digester, the screen separates pre-cooked chips, shives and pulp from the circulation liquid due to the fixed spaces of the precision slots of the primary screen.

However, the process conditions are such that the precision slots 5 of the primary screen 1 of the screen do not remain clean and the liquid circulation is disturbed. In that case the pressure difference between the plug flow and the liquid circulation on the suction side activates an external force which pushes the cleaning blades 10 of the secondary screen 2 into the slots between the strips of the primary screen 7 by means of a push rod 14 so that stuck pre-cooked chips, shives and pulp are pushed back into the plug flow. Depending on the programming of the power unit that operates the screen the motion can be repeated as many times as is necessary until the screen is sufficiently clean and the pressure difference has normalized.

The above description and the figures related thereto are only intended to illustrate the present invention. The invention is not limited to the embodiment described above or to the embodiment defined in the claims, but, as is obvious to a person skilled in the art, the invention may be modified in several different ways within the scope of the inventive concept disclosed in the appended claims.

I claim:

1. An apparatus comprising a mechanically cleanable screen arranged to separate chips, shives and pulp from the circulation liquid during the production of chemical pulp or paper pulp by a continuous method, characterized in that the screen comprises two independent screen elements arranged into a frame (3) one after another in the flow direction of the liquid to be filtered including a filtering primary screen (1) and a secondary screen (2) and comprising a push rod to move the secondary screen relative to the primary screen to clean the primary screen by shear and push forces.

2. An apparatus according to claim 1, characterized in that the primary screen (1) comprises a substantially planar or curved medium (6) which comprises elongated precision slots (5), and the secondary screen (2) comprises elongated cleaning blades (10) that can be arranged into the slots of the primary screen.

3. An apparatus according to claim 2, characterized in that the cleaning blades (10) of the secondary screen (2) are arranged to penetrate into the precision slots (5) of the primary screen (1).

4. An apparatus according to claim 3, characterized in that a power unit (15) is arranged to control the primary screen and/or the secondary screen (1, 2) for generating shear and push forces, the power unit being operated by an external force or process pressure or a combination thereof.

5. An apparatus according to claim 2, characterized in that the planar medium (6) comprises at least one transverse strip (9) which is arranged to divide the precision slots (5) into two or more parts in the longitudinal direction of the slots, whereby the precision slots on the different sides of the strip are misaligned.

6. An apparatus according to claim 2, characterized in that the screen has two separating positions, one of them being provided by the fixed precision slots (5) of the primary screen (1), and the other, which is considerably more accurate, being provided when the cleaning blade (10) of the secondary screen (2) is arranged into the precision slot of the primary screen.

7. An apparatus according to claim 2, characterized in that between the precision slots (5) of the primary screen (1) there are strips (7) which together with the cleaning blades (10) of the secondary screen (2) have a straight longitudinal profile with respect to the frame (3), the cross section being symmetric or asymmetric.

8. An apparatus according to claim 2, characterized in that between the precision slots (5) of the primary screen (1) there are strips (7) which together with the cleaning blades (10) of the secondary screen (2) have a convex longitudinal profile with respect to the frame (3), the cross section being symmetric or asymmetric.

9. An apparatus according to claim 2, characterized in that between the precision slots (5) of the primary screen (1) there are strips (7) which together with the cleaning blades (10) of the secondary screen (2) have a concave longitudinal profile with respect to the frame (3), the cross section being symmetric or asymmetric.

10. An apparatus according to claim 1, characterized in that the primary screen (1) and the secondary screen (2) are arranged to move simultaneously with respect to the frame (3).

11. An apparatus according to claim 10, characterized in that the cleaning blades (10) of the secondary screen (2) are arranged to penetrate into the precision slots (5) of the primary screen (1).

12. An apparatus according to claim 10, characterized in that the planar medium (6) comprises at least one transverse strip (9) which is arranged to divide the precision slots (5) into two or more parts in the longitudinal direction of the slots, whereby the precision slots on the different sides of the strip are misaligned.

13. An apparatus according to claim 10, characterized in that the secondary screen has two separating positions, one of them being provided by the fixed precision slots (5) of the primary screen (1), and the other, which is considerably more accurate, being provided when the cleaning blade (10) of the secondary screen (2) is arranged into the precision slot of the primary screen.

14. An apparatus according to claim 10, characterized in that between the precision slots (5) of the primary screen (1) there are strips (7) which together with the cleaning blades (10) of the secondary screen (2) have a straight longitudinal profile with respect to the frame (3), the cross section being symmetric or asymmetric.

15. An apparatus according to claim 10, characterized in that between the precision slots (5) of the primary screen (1) there are strips (7) which together with the cleaning blades (10) of the secondary screen (2) have a convex longitudinal profile with respect to the frame (3), the cross section being symmetric or asymmetric.

16. An apparatus according to clam 10, characterized in that between the precision slots (5) of the primary screen (1) there are strips (7) which together with the cleaning blades (10) of the secondary screen (2) have a concave longitudinal profile with respect to the frame (3), the cross section being symmetric or asymmetric.

17. An apparatus according to claim 1, characterized in that the primary screen (1) and the secondary screen (2) are arranged into the frame (3) so that one of the screens is fixed and the other one moves with respect to the frame.

18. An apparatus according to claim 17, characterized in that the cleaning blades (10) of the secondary screen (2) are arranged to penetrate into the precision slots (5) of the primary screen (1).

19. An apparatus according to claim 17, characterized in that the planar medium (6) comprises at least one transverse strip (9) which is arranged to divide the precision slots (5) into two or more parts in the longitudinal direction of the slots, whereby the precision slots on the different sides of the strip are misaligned.

20. An apparatus according to claim 17, characterized in that the secondary screen has two separating positions, one of them being provided by the fixed precision slots (5) of the primary screen (1), and the other, which is considerably more accurate, being provided when the cleaning blade (10) of the secondary screen (2) is arranged into the precision slots of the primary screen.

21. An apparatus comprising a mechanically cleanable screen arranged to separate chips, shives and pulp from a circulation fluid during production of chemical pulp or paper pulp by a continuous method, wherein the screen comprises:

a frame;

a filtering primary screen in said frame; and a filtering secondary screen in said frame and upstream in a direction of flow from said primary screen, and comprising a push rod to move said secondary screen relative to the primary screen to clean said primary screen from a direction opposite the direction of flow by shear and push forces.

* * * * *